US005494115A

United States Patent [19]

Hwong

[11] Patent Number: 5,494,115

[45] Date of Patent: Feb. 27, 1996

[54] ELECTRIC HAMMER DRILL

[76] Inventor: Steven Hwong, P.O. Box 82-144, Taipei, Taiwan

[21] Appl. No.: 328,682

[22] Filed: Oct. 25, 1994

[51] Int. Cl.[6] .............................. E21C 3/32; B23B 45/16

[52] U.S. Cl. .............................. 173/13; 173/48

[58] Field of Search .............................. 173/47, 13, 48, 173/104, 217

[56] References Cited

U.S. PATENT DOCUMENTS

| | | | |
|---|---|---|---|
| 3,693,728 | 9/1972 | Stroezel | 173/48 |
| 3,777,825 | 12/1973 | Gullich | 173/48 |
| 3,799,275 | 3/1974 | Plattenhardt et al. | 173/48 |
| 4,418,766 | 12/1983 | Grossman | 173/48 |
| 5,343,961 | 9/1994 | Ichikawa | 173/48 |
| 5,375,665 | 12/1994 | Fanchang et al. | 173/48 |

*Primary Examiner*—Scott A. Smith
*Attorney, Agent, or Firm*—Alfred Lei

[57] ABSTRACT

This invention relates to and electric hammer drill and in particular to one including a housing, a motor disposed in the housing, a trigger mounted in the housing and connected between the motor and a power source, a gearing coupled to an axle of the motor, a shift rod having a vertical flat surface and a cylindrical surface so that the vertical flat surface will be spaced from an end of a spindle when the shift rod is at an predetermined position and the cylindrical surface will be in contact with the end of the spindle when the shift rod is rotated through an angle of 180 degrees, a chuck fixedly connected to the other end of the spindle, an inner serrated collar rigidly mounted in the housing, an outer serrated collar connected with the spindle and disposed against the inner serrated collar with teeth being opposite each other, and a spring for keeping the two serrated collars apart at normal condition.

1 Claim, 4 Drawing Sheets

ELECTRIC HAMMER DRILL

SUMMARY OF THE INVENTION

This invention relates to an electric hammer drill.

It is the primary object of the present invention to provide an electric hammer drill which can be used as a hammer or a drill.

It is another object of the present invention to provide an electric hammer drill which is convenient in use.

It is still another object of the present invention to provide an electric hammer drill which is simple in construction.

It is still another object of the present invention to provide an electric hammer drill which has a long service life.

It is a further object of the present invention to provide an electric hammer drill which is economic to produce.

DETAILED DESCRIPTION OF THE PREFERRED EMBODIMENT

Figure 1:
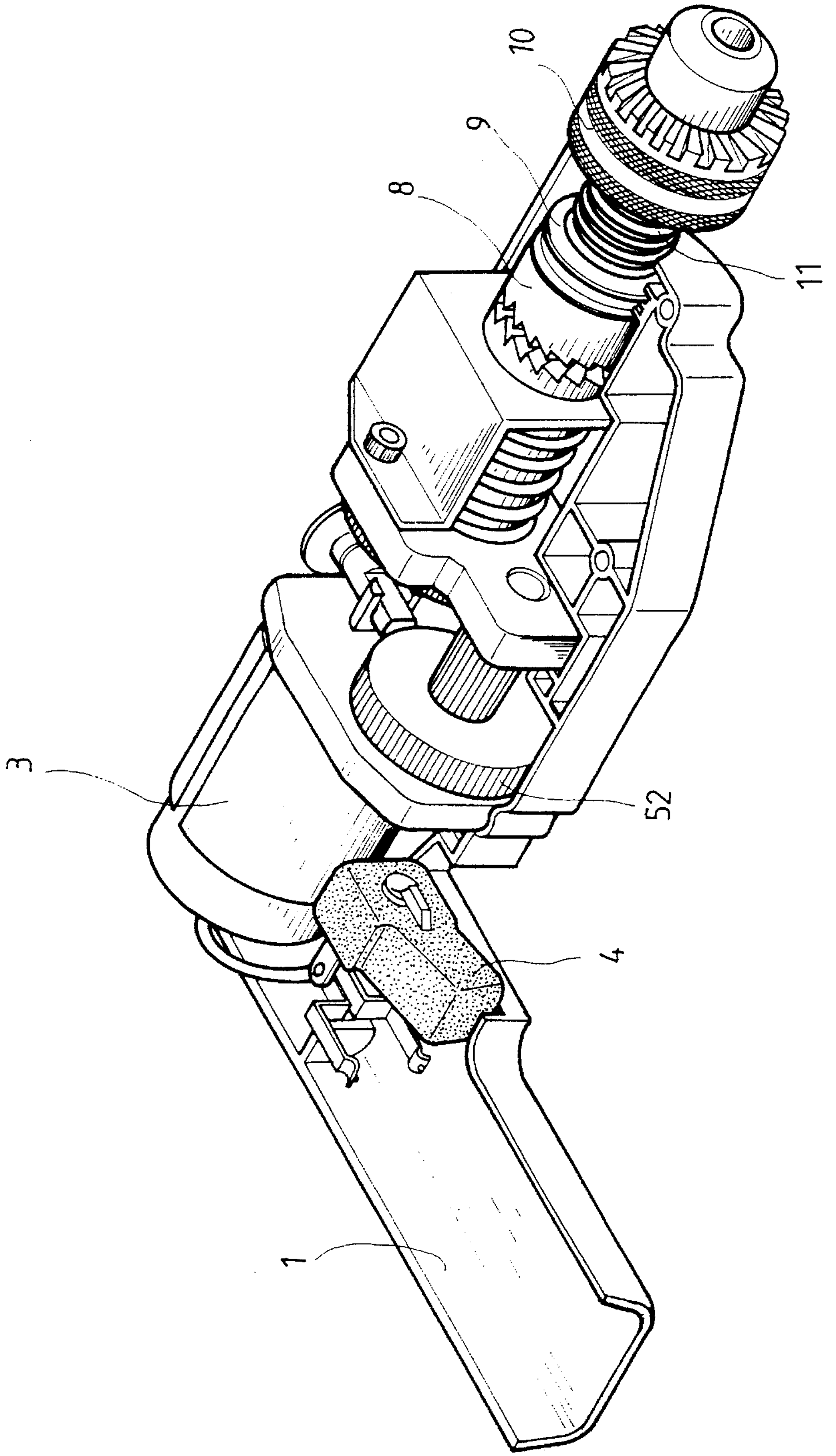
FIG. 1 is a perspective view of an electric hammer drill according to the present invention.
Figure 2:
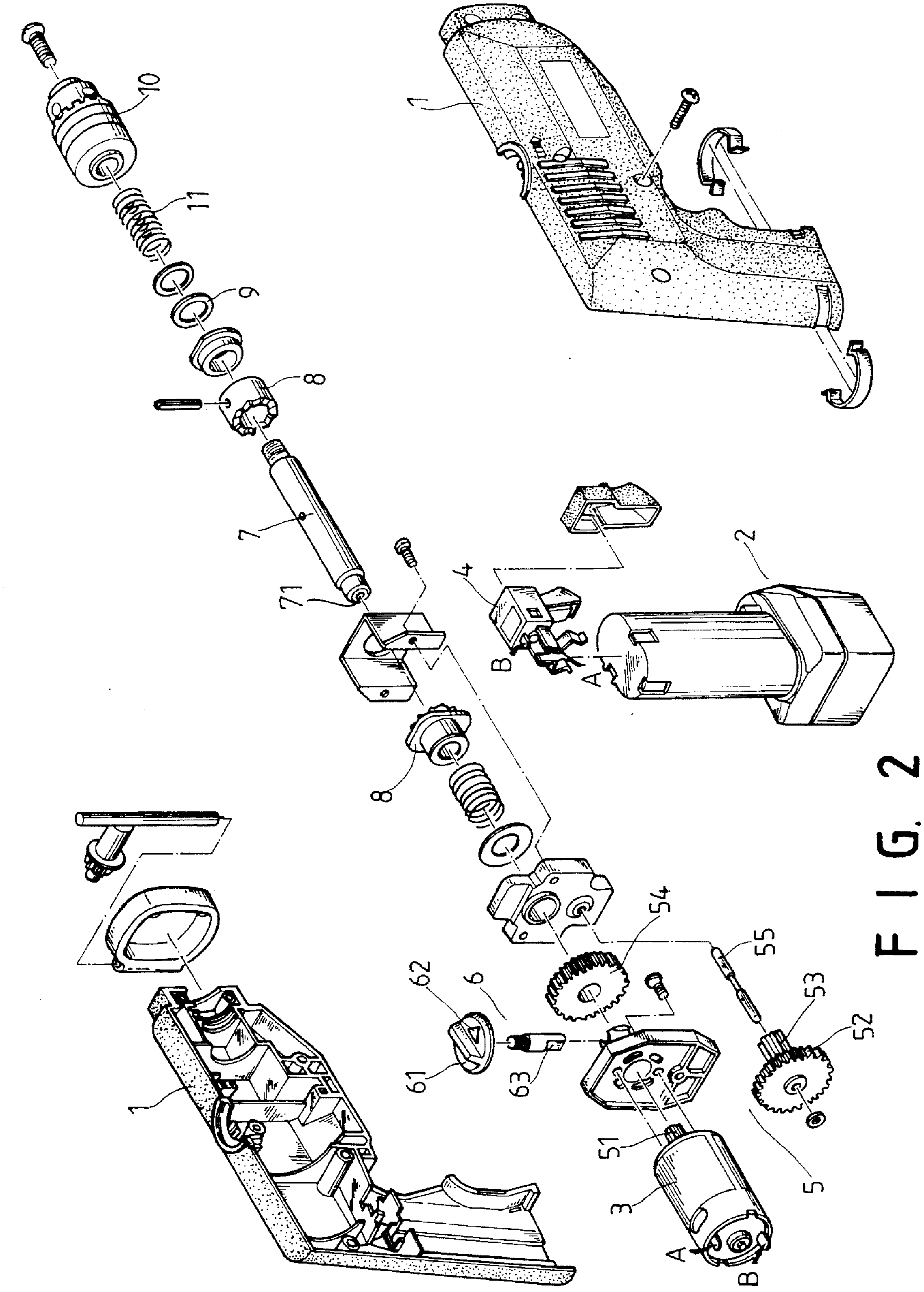
FIG. 2 is an exploded view of the electric hammer drill.

With reference to the drawings and in particular to FIGS. 1 and 2 thereof, the electric hammer drill mainly comprises a housing 1, a battery pack 2, a direct current motor 3, a trigger 4, a gearing 5, a shift rod 6, a spindle 7, two serrated collars 8, a dust proof packing 9 and a chuck 10.

The housing 1 is a pistol shaped member composed of two symmetric covers joined together by screws. The battery pack 2 is inserted into the grip of the housing 1 from the bottom thereof, contacting the terminals of the trigger 4. The motor 3 is disposed into the corner portion of the housing 1, with its terminals connected with the trigger 4. Hence, the motor 3 can be driven by the battery pack 2 and is controlled by the trigger 4 to rotate in clockwise or counterclockwise direction.

The gearing 5 consists of a driving gear 51, a reduction gear 52, a medium gear 53 and a driven gear 54. The driving gear 51 is rigidly mounted on the spindle of the motor 3 while the reduction gear 52 and the medium gear 53 are mounted on the same axle 55. The reduction gear 52 is engaged with the driving gear 51 and the driven gear 54 is meshed with the medium gear 53 and fixed on the spindle 7. The serrated collars 8 are put over the spindle 7, with their teech being opposite each other.

The dust protection packing 9 is put over the spindle 7 so as to prevent dust or the like from entering into the present invention thereby keeping the interior from being contaminated and therefore, extending the service life thereof. The chuck 10 is mounted on the free end of the spindle 7. Between the dust proof packing 9 and the chuck 10 there is a spring 11 whereby the chuck 10 is forced to move outwards thus separating the two serrated collars 8.

Figure 3:
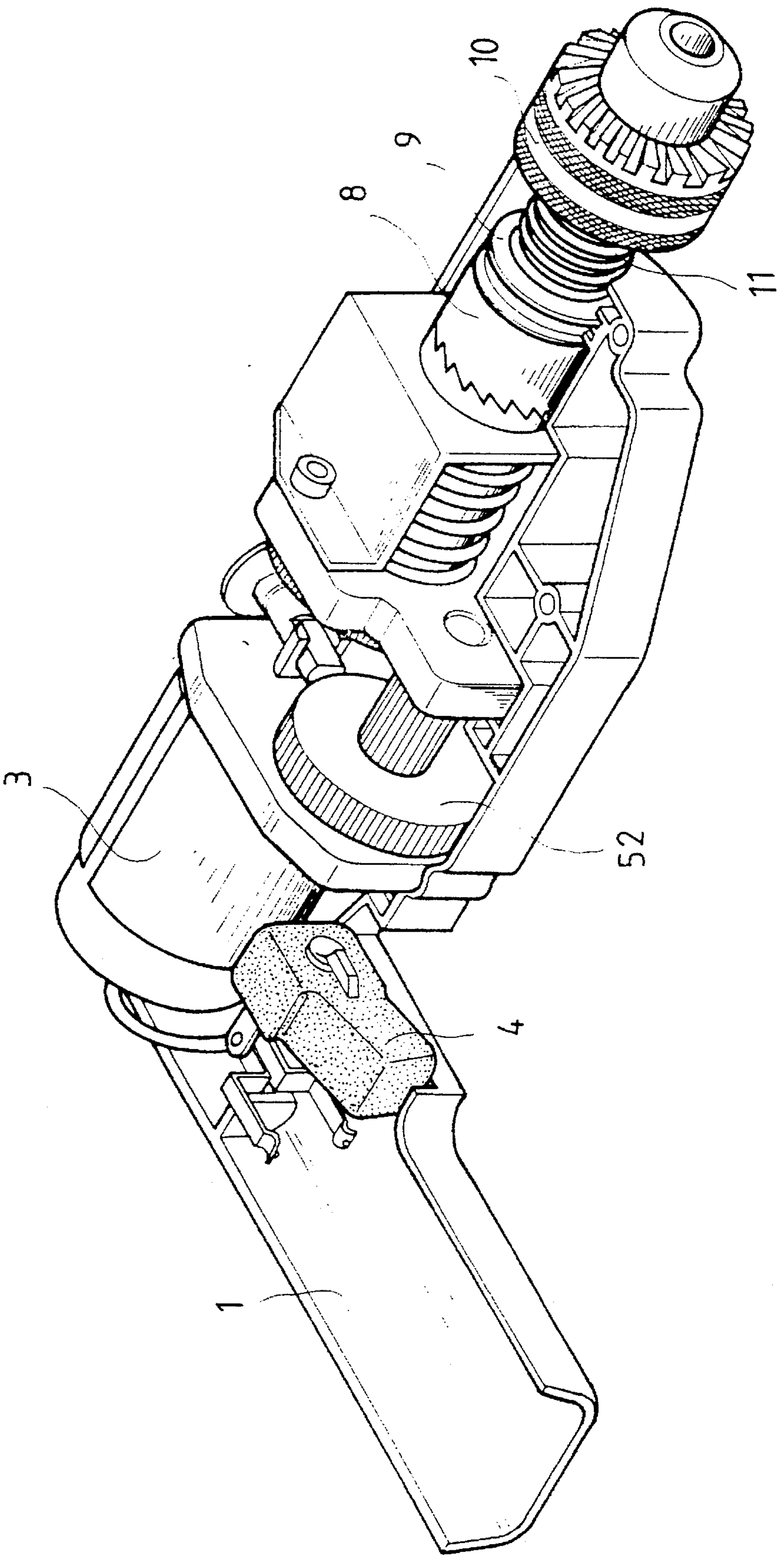
FIG. 3 shows how to use the present invention as a hammer.
Figure 4:
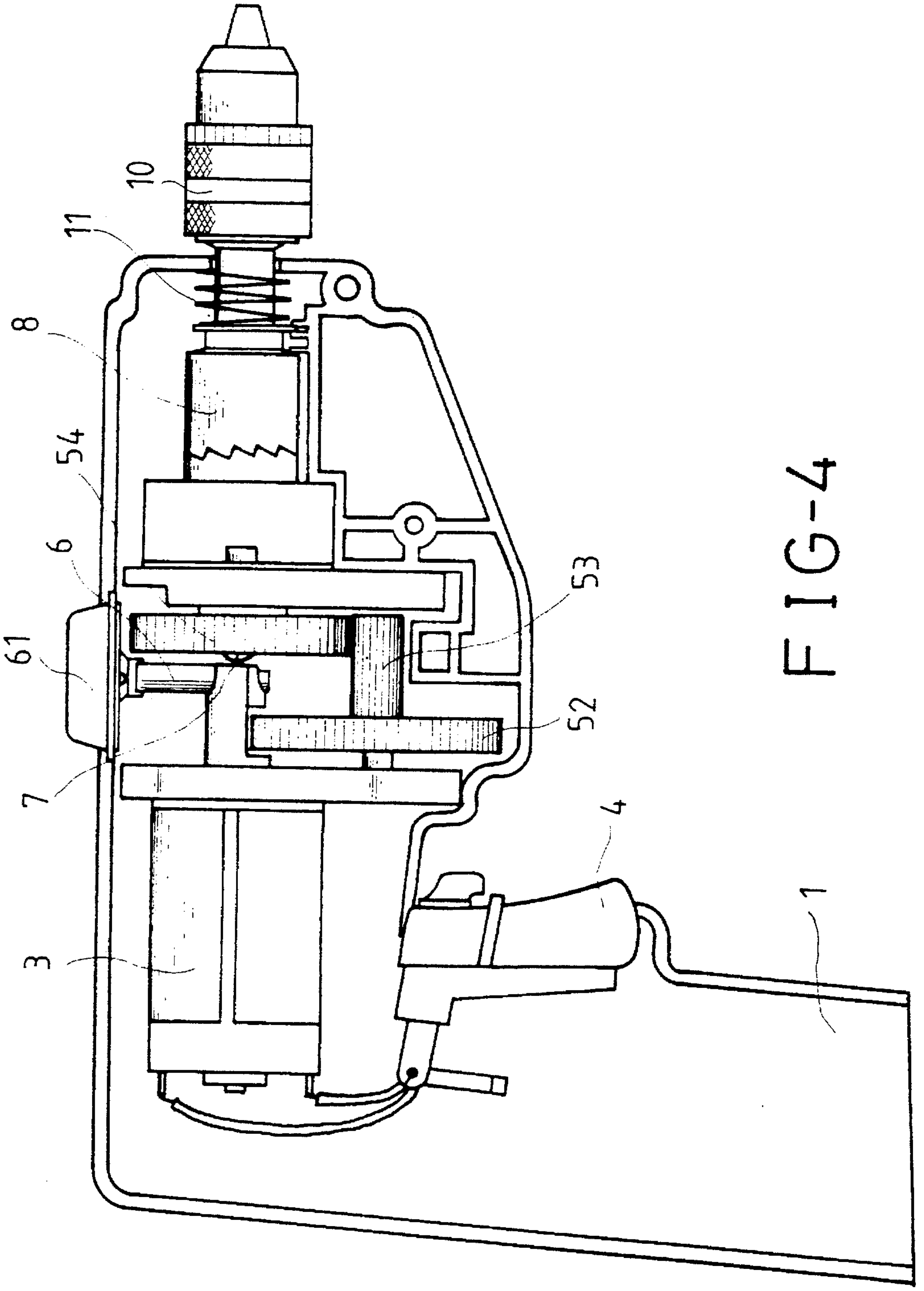
FIG. 4 is a side view of the electric hammer drill with its side cover removed.

The top of the shift rod 6 is fixedly connected with a swivel cap 61 the circumference of which is embedded into the upper edge of the housing 1 so that the swivel cap 61 can be rotated relative thereto. The shift rod 6 is disposed between the reduction gear 52 and the driven gear 54 and adjacent to the free end of the spindle 7. The lower flat vertical surface of the shift rod 6 is cut to form a flat surface 63. Since the shift rod 6 is fixed on the swivel cap 61, the shift rod 6 will rotate therewith when the swivel cap 61 is turned. When the shift rod 6 is turned to the position as shown in FIG. 2, the cylindrical surface of the shift rod 6 will just contact a steel ball 71 at the end of the spindle 7 hence preventing the spindle 7 from moving to and fro. However, when the shift rod 6 is turned to the position as shown in FIG. 3, the flat surface 63 of the shift rod 6 will be disposed adjacent the steel ball 71 at the end of the spindle 7 with a distance therebetween thus allowing the spindle 7 to move to and fro.

When desired to use the present invention as a common drill, simply turn the swivel cap 61 so that the indicating arrow 62 thereon is in alignment with the chuck 10. In the meantime, the cylindrical surface of the shift rod 6 just gets into touch with the steel ball 71 at the end of the spindle 7 consequently fixing the spindle 7 in position and the serrated collars 8 are kept away from each other. In use, it is only necessary to turn the directional switch 41 to the left or the right and then press the trigger 4. Hence, the battery pack 2 will provide power to the motor 3 which will then drive the spindle via the gearing 5 to rotate the chuck 10. Meanwhile, since the cylindrical surface of the shift rod 6 is in contact with the steel ball 71 at the end of the spindle 7, the spindle cannot move in longitudinal direction thus achieving the drilling purpose.

When desired to use the present invention as a hammer drill, simply turn the swivel cap 61 through an angle of 180 degrees so as to dispose the flat surface 63 of the shift rod 6 adjacent the steel ball 71 of the spindle 7. Then, when the trigger 4 is pressed, the battery pack 2 will supply power via the trigger 4 to the motor 3 which will then rotate the chuck 10. However, since there is a distance between the shift rod 6 and the steel ball 71 at the end of the spindle 7, the spindle 7 will move backwards when the drill (not shown) clamped in the chuck 10 is pressed against the wall or the workpiece (not shown). Furthermore, as the chuck 10 rotates, the outer serrated collar 8 will rotate relative to the inner serrated collar 8 and so the outer serrated collar will move to and fro at the time as it rotates on the other serrated collar thereby achieving the function of a hammer.

Although this invention has been described with a certain degree of particularity, it is understood that the present disclosure is made by way of example only and that numerous changes in the detail of construction and the arrangement of parts may be resorted to without departing from the spirit and scope of the invention as hereinafter claimed.

I claim:

1. A hammer drill comprising:

a housing;

a motor disposed in said housing;

a trigger mounted in said housing and connected between said motor and a battery pack adapted to be inserted into said housing;

a gearing coupled to an axle of said motor;

a shift rod having an upper end connected to a swivel cap, wherein a circumference of said swivel cap is rotatably embedded in an upper edge of said housing, said shift rod further having a lower vertical flat surface and a lower cylindrical surface so that said lower vertical flat surface will be spaced from a first end of a spindle when said swivel cap is at a predetermined position and said lower cylindrical surface will be in contact with said first end of said spindle when said swivel cap is rotated through an angle of 180 degrees;

a chuck fixedly connected to a second end of said spindle outside said housing;

an inner serrated collar rigidly mounted in said housing;

an outer serrated collar connected with said spindle and disposed against said inner serrated collar wherein teeth members of said inner and outer serrated collars are opposed to each other;

a dust proof packing arranged between said chuck and said outer serrated collar thereby preventing dust from entering said housing; and a spring mounted between and in contact with said dust proof packing and said chuck.

* * * * *